(12) United States Patent
Wen et al.

(10) Patent No.: US 8,773,585 B2
(45) Date of Patent: Jul. 8, 2014

(54) METHOD AND IMAGE PROCESSING APPARATUS FOR IDENTIFYING STATE OF MACRO BLOCK OF DE-INTERLACING COMPUTING

(71) Applicant: ALi (Zhuhai) Corporation, Guangdong (CN)

(72) Inventors: Jin-Song Wen, Guangdong (CN); Feng Gao, Guangdong (CN); Jin-Fu Wang, Guangdong (CN)

(73) Assignee: ALi (Zhuhai) Corporation, Guangdong (CN)

( * ) Notice: Subject to any disclaimer, the term of this patent is extended or adjusted under 35 U.S.C. 154(b) by 0 days.

(21) Appl. No.: 13/748,265

(22) Filed: Jan. 23, 2013

(65) Prior Publication Data

US 2014/0085535 A1    Mar. 27, 2014

(30) Foreign Application Priority Data

Sep. 27, 2012   (CN) .......................... 2012 1 0369638

(51) Int. Cl.
*H04N 7/01* (2006.01)
*H04N 11/20* (2006.01)

(52) U.S. Cl.
USPC ........... 348/441; 348/443; 348/446; 348/448; 348/449; 348/451; 348/452; 348/454; 348/456; 348/458; 348/459; 348/474; 348/490; 348/412.1; 348/415.1; 348/420.1; 348/421.1; 348/439.1; 348/14.15; 348/305; 348/317; 348/333.03; 348/513; 348/515; 348/516; 348/522; 348/526; 348/563; 348/569; 348/620; 348/670; 348/701; 348/793

(58) Field of Classification Search
USPC ......... 348/441, 448, 458, 446, 459, 452, 449, 348/443, 451, 454, 456, 474, 490, 14.15, 348/412.1, 415.1, 420.1, 421, 439.1, 305, 348/317, 333.03, 513, 515, 516, 522, 526, 348/563, 569, 620, 670, 701, 793
See application file for complete search history.

(56) References Cited

U.S. PATENT DOCUMENTS

| | | | |
|---|---|---|---|
| 6,118,486 A * | 9/2000 | Reitmeier | ..................... 348/441 |
| 6,269,484 B1 * | 7/2001 | Simsic et al. | ................. 725/151 |
| 6,421,385 B1 * | 7/2002 | Uenoyama et al. | ........ 375/240.2 |
| 6,728,317 B1 * | 4/2004 | Demos | ..................... 375/240.21 |
| 7,057,665 B2 * | 6/2006 | Jung et al. | ..................... 348/452 |

(Continued)

FOREIGN PATENT DOCUMENTS

CN    1316824    5/2007

*Primary Examiner* — Jefferey Harold
*Assistant Examiner* — Mustafizur Rahman
(74) *Attorney, Agent, or Firm* — J.C. Patents

(57) ABSTRACT

A method for identifying state of macro block of de-interlacing computing and an image processing apparatus are provided, the method is as follows. A video frame is divided into a plurality of regions, where each of the regions includes a plurality of macro blocks. Then, a basic threshold corresponding to each of the regions is provided according to a position of each of the regions in the video frame, and a first macro block is identified to be a first type macro block or a second type macro block according to the basic threshold corresponding to one of the regions where the first macro block of the macro blocks locates. Then, a corresponding de-interlacing computing step is performed on the first macro block according to an result that the first macro block is identified as the first type macro block or the second type macro block.

18 Claims, 2 Drawing Sheets

(56) References Cited

U.S. PATENT DOCUMENTS

| | | | |
|---|---|---|---|
| 7,215,375 B2 | 5/2007 | Chen et al. | |
| 7,471,834 B2* | 12/2008 | Sull et al. | 382/232 |
| 7,535,959 B2* | 5/2009 | Lightstone et al. | 375/240.04 |
| 7,822,122 B2* | 10/2010 | Tsai et al. | 375/240.16 |
| 8,270,480 B2* | 9/2012 | Yin et al. | 375/240.12 |
| 2002/0057383 A1* | 5/2002 | Iwamura | 348/734 |
| 2006/0110062 A1* | 5/2006 | Chiang et al. | 382/260 |
| 2010/0246681 A1* | 9/2010 | Wang et al. | 375/240.16 |
| 2010/0246682 A1* | 9/2010 | Zhao et al. | 375/240.16 |
| 2011/0150091 A1* | 6/2011 | Young | 375/240.16 |
| 2011/0202688 A1* | 8/2011 | Shah et al. | 710/5 |
| 2012/0219062 A1* | 8/2012 | Chou | 375/240.16 |

* cited by examiner

METHOD AND IMAGE PROCESSING APPARATUS FOR IDENTIFYING STATE OF MACRO BLOCK OF DE-INTERLACING COMPUTING

CROSS-REFERENCE TO RELATED APPLICATION

This application claims the priority benefit of China application serial no. 201210369638.3, filed on Sep. 27, 2012. The entirety of the above-mentioned patent application is hereby incorporated by reference herein and made a part of this specification.

BACKGROUND

1. Technical Field

The invention relates to an image processing technique. Particularly, the invention relates to a method and an image processing apparatus for identifying state of macro block of de-interlacing computing.

2. Related Art

To perform de-interlacing computing on a video stream is an important part in an image processing technique. The de-interlacing computing can de-interlace a video stream of an interlacing format into a video stream of a de-interlacing format. To ensure a smooth de-interlacing computing, before the de-interlacing computing is performed on a video frame in the video stream that is to be displayed, a macro block state of each macro block in the video frame can be quickly identified through a mechanism. Generally, a linear approach function (LAF) generator can be used to quickly identify the macro block state of each macro block in the video frame. Such mechanism generally generates a motion flag bit for each macro block to represent the macro block state. Besides, a non-linear approach function generator or other methods can be used to identify the motion flag bit or the state of each macro block. The method used for identifying each of the macro blocks is not limited by the invention, and those skilled in the art should understand that the LAF generator mentioned above is only an example, which is not used to limit the invention.

Generally, the macro block state or the motion flag bit includes a weave state and a bob state. Regarding the macro block with the macro block state of the weave state, during a process of the de-interlacing computing of the macro block, an image processing apparatus combines data of two fields into one frame, which is suitable for the macro blocks with little image variation. On the other hand, regarding the macro block with the macro block state of the bob state, during the process of the de-interlacing computing of the macro block, the image processing apparatus can use data of a single field to form a frame, which is suitable for macro blocks with a constant image variation. In brief, the macro block of the weave state is similar to a static macro block, which has little image variation, for example, a static region in the video frame. The macro block of the bob state is similar to a dynamic macro block, which has large image variation, for example, a dynamic region in the video frame.

However, when the macro block state is misidentified, it severely influences the display quality of the video frame. For example, when the macro block of the weave state is misidentified as a macro block of the bob state, it is liable to have stairs or misaligned bevels on the video frame. Moreover, when the macro block of the bob state is misidentified as a macro block of the weave state, it is liable to have shredded feathers or a rolling edge on the video frame.

Therefore, the conventional technique provides a concept of devour module. After the macro block state of one macro block in the video frame is preliminarily identified, the devour module takes such macro block as a center macro block to compute the number of the macro blocks around the center macro block that are determined to have the weave state or the bob state, and determines whether or not to change the macro block state of the center macro block according to a preset threshold. For example, it is assumed that the macro block state of the center macro block is the weave state, and the number of the macro blocks around the center macro block that are determined to have the weave state is smaller than a weave state threshold, the macro block state of the center macro block is transformed to the bob state. Alternatively, it is assumed that the macro block state of the center macro block is the bob state, and the number of the macro blocks around the center macro block that are determined to have the bob state is smaller than a bob state threshold, the macro block state of the center macro block is transformed to the weave state.

However, in the conventional technique, the threshold used by the devour module is fixed. If the threshold corresponding to the macro blocks of each part in the video frame cannot be adaptively adjusted, it is liable to cause the misidentification, which decreases the display quality of the video frame.

SUMMARY

The invention is directed to a method and an image processing apparatus for identifying state of macro block of de-interlacing computing, by which a basic threshold corresponding to each region in a video frame is adaptively provided and adjusted, so as to effectively mitigate a situation that a macro block state of each macro block in the video frame is misidentified.

The invention provides a method for identifying state of macro block of de-interlacing computing, which is adapted to an image processing apparatus. The method includes following steps. A video frame is divided into a plurality of regions, where each of the regions includes a plurality of macro blocks. Then, a basic threshold corresponding to each of the regions is provided according to a position of each of the regions in the video frame, and a first macro block is identified to be a first type macro block or a second type macro block according to the basic threshold corresponding to one of the regions where the first macro block of the macro blocks locates. Then, a corresponding de-interlacing computing step is performed on the first macro block according to a result that the first macro block is identified as the first type macro block or the second type macro block.

The invention provides an image processing apparatus including an adjusting module and a de-interlacing module. The adjusting module divides a video frame into a plurality of regions, where each of the regions includes a plurality of macro blocks. The de-interlacing module is connected to the adjusting module. The adjusting module provides a basic threshold corresponding to each of the regions according to a position of each of the regions in the video frame, and identifies a first macro block to be a first type macro block or a second type macro block according to the basic threshold corresponding to one of the regions where the first macro block of the macro blocks locates. Moreover, the de-interlacing module performs a corresponding de-interlacing computing step on the first macro block according to a result that the first macro block is identified as the first type macro block or the second type macro block.

According to the above descriptions, the invention provides the method and the image processing apparatus for identifying state of macro block of de-interlacing computing, by which the macro block state of the macro block can be identified according to the position of the macro block on the video frame and the basic threshold corresponding to the position, which effectively improves identifying accuracy of the image processing apparatus on the macro blocks.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

To ensure an image processing apparatus to accurately identify a macro block state of each macro blocks in a video frame, an embodiment of the invention provides a method for identifying state of macro block of de-interlacing computing, by which the video frame is divided into a plurality of regions, and a basic threshold is assigned to each region, so as to identify a macro block state of each macro block in each region according to the basic threshold corresponding to each of the regions. In this way, a situation of misidentifying a macro block state of each macro block in the video frame is greatly mitigated, and image clarity of a played video stream is effectively improved. Moreover, in the method for identifying state of macro block of de-interlacing computing, the basic threshold corresponding to each region can be adjusted through a threshold adjusting parameter, so as to further improve identifying accuracy of the macro block state.

On the other hand, when the video frame is required to be resized, according to the method for identifying state of macro block of de-interlacing computing, a cutoff frequency parameter can be used to perform a resizing operation on one or a plurality of regions in the video frame, so as to improve image clarity of the resized video frame. Moreover, the embodiment of the invention further provides an image processing apparatus used for implementing the method for identifying state of macro block of de-interlacing computing. In order to fully convey the spirit of the invention, embodiments are provided below for detailed descriptions.

Figure 1:
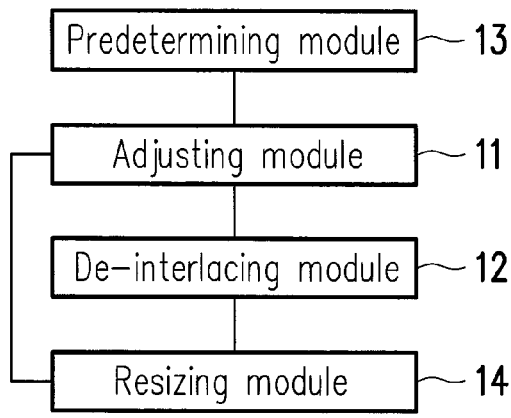
FIG. 1 is a functional block diagram of an image processing apparatus according to an embodiment of the invention.
Figure 2:
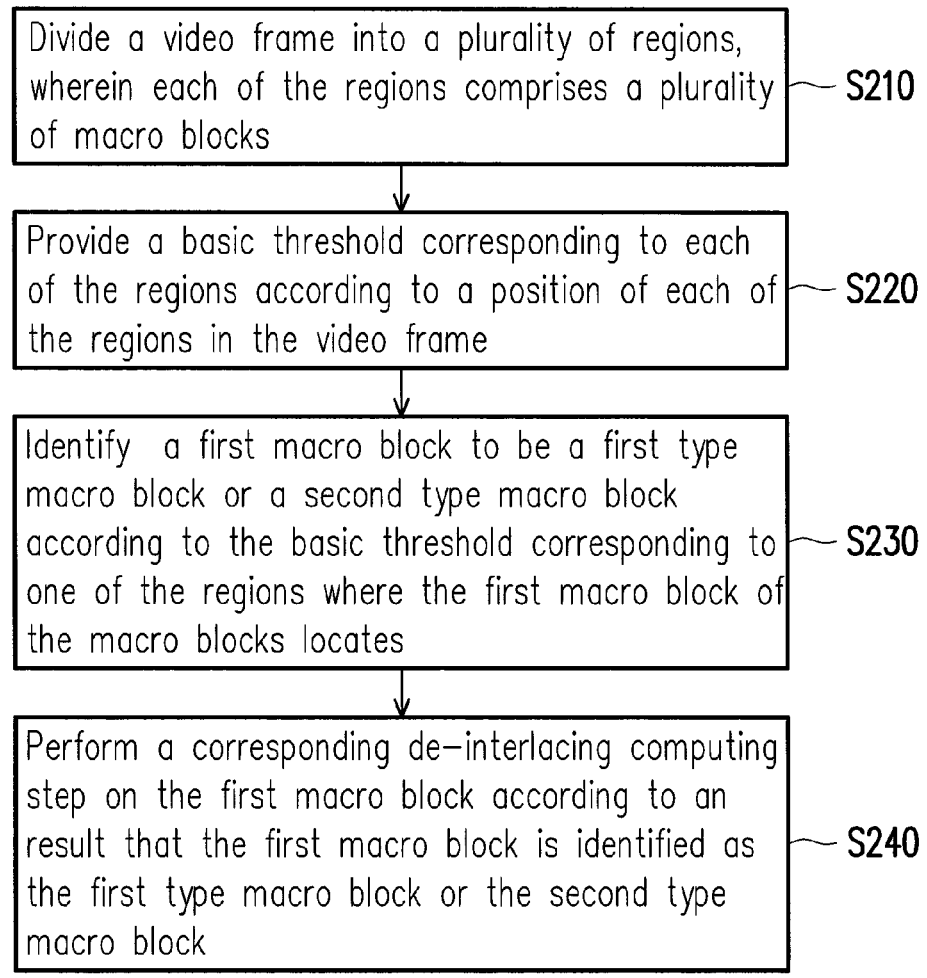
FIG. 2 is a flowchart illustrating a method for identifying state of macro block of de-interlacing computing according to an embodiment of the invention.

FIG. 1 is a functional block diagram of an image processing apparatus according to an embodiment of the invention. FIG. 2 is a flowchart illustrating a method for identifying state of macro block of de-interlacing computing according to an embodiment of the invention. Referring to FIG. 1 and FIG. 2, the image processing apparatus 10 includes an adjusting module 11 and a de-interlacing module 12, where the adjusting module 11 is connected to the de-interlacing module 12.

The image processing apparatus 10 can be applied to various portable electronic devices such as a set top box, a television, a personal digital assistant (PDA), a smart phone, an e-book, a game machine, a notebook, a tablet PC, etc., or a desktop computer, etc.

In step S210, the adjusting module 11 divides a video frame into a plurality of regions, where each of the regions includes a plurality of macro blocks. Then, in step S220, the adjusting module 11 provides a basic threshold corresponding to each of the regions according to a position of each of the regions in the video frame. For example, in the present embodiment, the basic threshold is similar to a ve_laf_setting parameter used by a linear approach function (LAF) generator, which can be used to assist the adjusting module 11 to identify the macro block states of the macro blocks in each of the regions. In another embodiment, another manner can also be used to generate the basic threshold corresponding to each of the regions, for example, a non-linear approach function generator can be used. Those skilled in the art should understand that usage of the LAF generator is only an example, which is not used to limit the invention. The spirit of the invention is to obtain the basic threshold of each macro blocks according to a certain manner, although it cannot completely and accurately predict whether each pixel points is dynamic or static through any manner, at least an identifying foundation with higher reliability can be obtained first. If the basic threshold corresponding to a region is increased, the macro blocks in such region are more easier to be identified as bob macro blocks or dynamic macro blocks (which is referred to as a first type macro blocks). Conversely, if the basic threshold corresponding to a region is decreased, the macro blocks in such region are more easier to be identified as weave macro blocks or static macro blocks (which is referred to as a second type macro blocks).

Moreover, in another embodiment of the invention, the basic threshold may include a first type threshold and a second type threshold, where the first type threshold is, for example, a bob threshold or a dynamic threshold, and the second type threshold is, for example, a weave threshold or a static threshold. Regarding a region where an image of the video frame therein constantly changes, the adjusting module 11 can decrease the first type threshold corresponding to such region, and increase the second type threshold corresponding to such region, such that the macro blocks in such region are more easier to be identified as the first type macro blocks. Moreover, regarding a region where an image of the video frame therein rarely changes or has little image variation, the adjusting module 11 can increase the first type threshold corresponding to such region, and decrease the second type threshold corresponding to such region, such that the macro blocks in such region are more easier to be identified as the second type macro blocks.

Then, after step S220, in step S230, the adjusting module 11 identifies a macro block (which is referred to as a first macro block) of the macro blocks to be a first type macro block or a second type macro block according to the basic threshold corresponding to one of the regions where the first macro block locates.

Then, after step S230, in step S240, the de-interlacing module 12 performs a corresponding de-interlacing computing step on the first macro block according to a result of the step S230 that the first macro block is identified as the first type macro block or the second type macro block. For example, when the result indicates that the first macro block is the first type macro block, the de-interlacing module 12 performs the de-interlacing computing step suitable for the bob macro blocks or the dynamic macro blocks. Alternatively, when the result indicates that the first macro block is the second type macro block, the de-interlacing module 12 performs the de-interlacing computing step suitable for the weave macro blocks or the static macro blocks. Moreover, since the de-interlacing computing step is a known technique, and it is not a focal point of the invention, details thereof are not introduced.

It should be noticed that in order to combine the invention with the existing product or technique, in an embodiment of the invention, the adjusting module 11 may also include a devour module of the conventional technique, which determines whether or not to adaptively adjust the macro block state of one or a plurality of macro blocks in an identifying unit according to the basic threshold corresponding to the region where each identifying unit locates, so as to greatly mitigate a situation that the devour module misidentifies the macro block state. For example, nine neighboring macro blocks are taken as an identifying unit, it is assumed that the basic threshold corresponding to the region where the identifying unit locates is that "the first type threshold is 2 and the second type threshold is 7", it represents that in the nine neighboring macro blocks, as long as the number of the first type macro blocks is greater than 2 or the number of the second type macro blocks is smaller than 7, the adjusting module 11 identifies one or a plurality of macro blocks in the macro blocks to be the first type macro blocks. In other words, unless the number of the second type macro blocks in the identifying unit is greater than 7 or the number of the first type macro blocks is smaller than 2, the second type macro blocks in the identifying unit are all identified as the first type macro blocks.

Alternatively, it is assumed that the basic threshold corresponding to the region where the identifying unit locates is that "the first type threshold is 7 and the second type threshold is 2", it represents that in the nine neighboring macro blocks, unless the number of the first type macro blocks is greater than 7 or the number of the second type macro blocks is smaller than 2, the first type macro blocks in the identifying unit are all identified as the second type macro blocks. However, as long as the number of the second type macro blocks is greater than 2 or the number of the first type macro blocks is smaller than 7, the adjusting module 11 identifies one or a plurality of macro blocks in the macro blocks to be the second type macro blocks. In this way, different to the conventional technique that the devour module identifies the macro block state only according to a fixed threshold, in the embodiment, a misidentifying rate of the adjusting module 11 on the macro block state can be effectively decreased through the adaptively adjusted basic thresholds.

In order to clearly describe a manner and meaning of dividing the video frame into a plurality of regions, a video frame obtained when a general set top box (STB) plays TV signals is taken as an example for descriptions.

Figure 3:
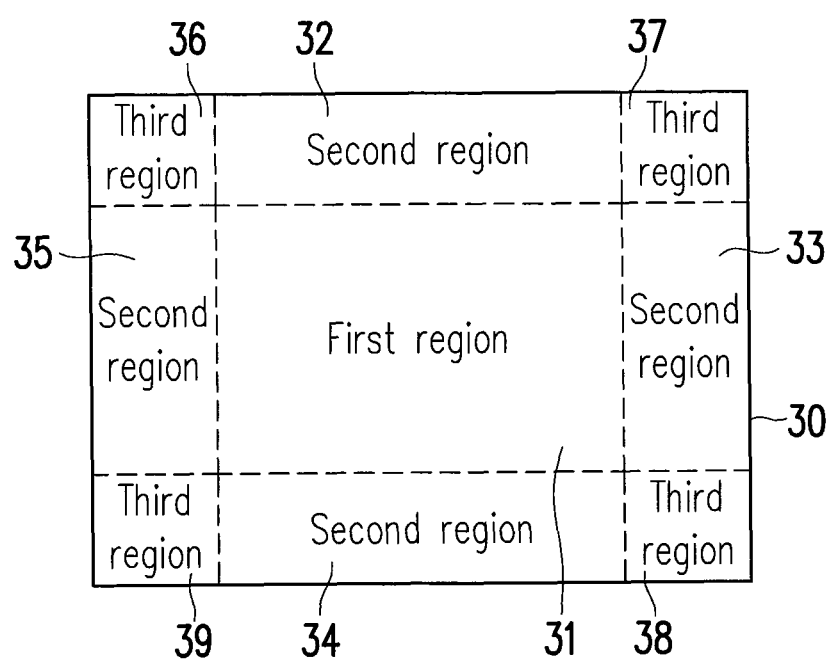
FIG. 3 is a schematic diagram of dividing a video frame into a plurality of regions according to an embodiment of the invention.

FIG. 3 is a schematic diagram of dividing a video frame into a plurality of regions according to an embodiment of the invention. Referring to FIG. 3, the video frame 30 is divided into a first region 31, second regions 32-35 and third regions 36-39. Generally, a central portion of the video frame is a main program content presenting region, and presenting of the video frame has no special pattern, for example, dynamic frame-biased or static frame-biased. Therefore, the first region 31 located at the central portion of the video frame 30 can be a normal region, and a basic threshold of the first region 31 can be assigned according to a common manner, for example, the first type threshold of the first region 31 is 6 and the second type threshold thereof is 3.

Generally, a subtitle or a scrolling text such as a marquee, etc. of the TV program is generally presented at an edge of the video frame. Therefore, the second regions 32-35 can be dynamic regions or scrolling text regions, and the second regions 32-35 are closer to the edge of the video frame 30 compared to that of the first region 31. Taking the basic thresholds corresponding to the first region 31 as a reference, compared to the basic thresholds corresponding to the first region 31, the basic thresholds corresponding to the second regions 32-35 makes the macro blocks in the second regions 32-35 to be more easier identified as the first type macro blocks (i.e. the bob macro blocks or the dynamic macro blocks) compared to that of the macro blocks in the first region 31. For example, the first type threshold corresponding to the second regions 32-35 is 2 and the second type threshold thereof is 7.

Moreover, a logo of a TV station or a program channel is generally displayed at a corner of the video frame, for example, a top left corner, a top right corner, a bottom left corner or a bottom right corner of the video frame. Therefore, the third regions 36-39 can be divided as logo regions, and the third regions 36-39 are closer to the corners of the video frame 30 compared to that of the first region 31 and the second regions 32-35. Taking the basic thresholds corresponding to the third regions 36-39 as a reference, compared to the basic thresholds corresponding to the first region 31, the basic thresholds corresponding to the third regions 36-39 makes the macro blocks in the third regions 36-39 to be more easier identified as the second type macro blocks (i.e. the weave macro blocks or the static macro blocks) compared to that of the macro blocks in the first region 31. For example, the first type threshold corresponding to the third regions 36-39 is 7 and the second type threshold thereof is 2.

It should be noticed that the above dividing method only an example of roughly dividing the video frames of general TV signals, which is not used to limit the invention. In an embodiment of the invention, the regions of the video frame can be adaptively divided according to a type of the program channel or user's demand. For example, when the user watches a movie or a TV series, the images of the movie or the TV series are the most important to the user, and the marquee or the scrolling text at the edge of the video frames are less important. Therefore, taking FIG. 3 as an example, regarding a movie channel, only the second region 34 in the second regions 32-35 may be retained to clearly present the subtitle of the movie or the photo album, and the second regions 32-33 and the second region 35 can be divided into the first region 31 to achieve a better viewing quality. Similarly, in other embodiments of the invention, the above dividing method can be adaptively adjusted according to different program channels, program types or user's demands, so as to cope with the spirit of the invention.

In an embodiment of the invention, in order to increase a playing speed or a processing speed of the image processing apparatus on the video stream, the image processing apparatus can preliminarily determine the macro block state of each macro block in the video frame according to a preset threshold in a quick speed in advance. Then, the image processing apparatus adjusts the preset threshold to the basic threshold, and uses the adjusted basic threshold to identify, verify and modify the macro block state of each macro block, so as to decrease the misidentifying rate.

Referring to FIG. 1 again, in an embodiment of the invention, the image processing apparatus 10 may also include a predetermining module 13 connected to the adjusting module 11. The predetermining module 13 sets a preset threshold, and preliminarily determines one or a plurality of macro blocks in the video frame to be the first type macro blocks or the second type macro blocks according to the preset threshold.

In the present embodiment, the predetermining module 13 may include an LAF generator, which may quickly analyse the state of macro blocks of the video frames in the video stream, so as to preliminarily determine the macro block state of each macro block in the video frame. Moreover, the preset threshold is, for example, a ve_laf_setting parameter or a similar preset parameter (or a plurality of parameters), which can be used by the predetermining module 13 to determine one or a plurality of macro blocks in the video frame to be the first type macro blocks or the second type macro blocks.

Then, the adjusting module 11 obtains a threshold adjusting parameter corresponding to the above preset threshold. For example, the adjusting module 11 can obtain the threshold adjusting parameter corresponding to the preset threshold by looking up at least one look-up table. Alternatively, the adjusting module 11 can obtain the threshold adjusting parameter corresponding to the preset threshold by using at least one corresponding function. The corresponding function can be any linear or non-linear curve function, for example, a function satisfying an application demand of the invention, such as $y=k \times x$, or $y=k \times x+b$, etc., and the adjusting module 11 can obtain the threshold adjusting parameter positively correlated to the preset threshold according to the corresponding function.

Then, after the adjusting module 11 obtains the threshold adjusting parameter, the adjusting module 11 adjusts the basic threshold corresponding to the region where the one or a plurality of macro blocks locate by using the threshold adjusting parameter. The adjusting module 11 adjusts the basic threshold according to a following equation (1):

New basic threshold=original basic threshold×threshold adjusting parameter  (1)

Alternatively, the adjusting module 11 can adjust the first type threshold and the second type threshold according to following equations (2) and (3):

New first type threshold=original first type threshold× threshold adjusting parameter  (2)

New second type threshold=reference value−new first type threshold  (3)

The aforementioned reference value is, for example, a sum of the first type threshold and the second type threshold. For example, the first type threshold is 7 and the second type threshold is 2, the reference value is then 9.

However, the method of adaptively adjusting the basic threshold is not limited to the above descriptions. In an embodiment of the invention, the image processing apparatus can also adjust the basic threshold corresponding to each region according to the number of the first type macro blocks and the number of the second type macro blocks in the region of the video frame. For example, it is assumed that the adjusting module 11 adjusts the basic threshold corresponding to the region where one or a plurality of target macro blocks locate, the adjusting module 11 can compute the number of the macro blocks identified as the first type macro blocks (which is referred to as a first number) in a target region where the target macro blocks locate, and computes the number of the macro blocks identified as the second type macro blocks (which is referred to as a second number) in the target macro blocks.

Then, the adjusting module 11 adaptively adjusts the basic threshold corresponding to the target region where the target macro blocks locate according to the first number and the second number. In detail, the adjusting module 11 computes a ratio of the first number and the second number, where the ratio is, for example, obtained by dividing the first number by the second number or dividing the second number by the first number. Then, the adjusting module 11 obtains the threshold adjusting parameter corresponding to the ratio. For example, the adjusting module 11 can obtain the threshold adjusting parameter corresponding to the ratio by looking up at least one look-up table. Alternatively, the adjusting module 11 can obtain the threshold adjusting parameter corresponding to the ratio by using at least one corresponding function, so as to adjust the basic threshold corresponding to the target region where the target macro blocks locate by using the threshold adjusting parameter. The corresponding function can be any linear or non-linear curve function, for example, a function satisfying an application demand of the invention, such as $y=k \times x$, or $y=k \times x+b$, etc., and the adjusting module 11 obtains the threshold adjusting parameter positively correlated to the ratio according to the corresponding function. Then, referring to the equations (1)-(3), the adjusting module 11 subsequently adjusts the basic threshold by using the threshold adjusting parameter.

On the other hand, in order to improve image clarity of the resized video frame, in an embodiment of the invention, the image processing apparatus can adaptively adjust a clarity parameter. The clarity parameter may include one of following parameters or combinations thereof, and any one of the parameters influences clarity or sharpness of the image. For example, a horizontal interpolation frame point number and/or a vertical interpolation frame point number, which serves as a reference of point number during interpolation. The aforementioned parameters may further include a de-noise parameter and a detail enhancement parameter, etc. to facilitate a high-pass filtering image processing. The parameters may further include a cutoff frequency parameter, and a suitable cutoff frequency parameter can be used to perform a resizing computing on the video frame, so as to achieve an effect of improving the image clarity.

Referring to FIG. 1 again, in an embodiment of the invention, the image processing apparatus 10 may further include a resizing module 14, which is connected to the adjusting module 11 and the de-interlacing module 12. In the present embodiment, the adjusting module 11 computes the cutoff frequency parameter, and provides the same to the resizing module 14. When the video frame transformed to the de-interlacing format is required to be resized, the resizing module 14 performs the resizing computing on a target region by using the cutoff frequency parameter, so as to improve image clarity of the video frame after the video frame is resized. In the present embodiment, the resizing module 14 may include a low pass filter, which is capable of changing image clarity of each region in the output video frame by using the cutoff frequency parameter of the region in the video frame.

Generally, the greater the cutoff frequency parameter is (which is at most 1 after normalization), the clearer the output video frame of the resizing module 14 is. The smaller the cutoff frequency parameter is (which is at least 0 after normalization), the more blur the output video frame of the resizing module 14 is. Therefore, regarding the region in which the macro block states of the macro blocks in the video frame is liable to be misidentified, for example, a region with similar number of the first type macro block and the second type macro block, or a region with interlaced first type macro blocks and second type macro blocks, the adjusting module 11 can decrease the cutoff frequency parameter of such region to avoid oversharpness of the displayed video frame to aggravate the misidentification. Moreover, regarding the region in which the macro block states of the macro blocks in the video frame is not liable to be misidentified, for example, a region full of the first type macro blocks or the second type macro blocks, the adjusting module 11 can increase the cutoff frequency parameter of such region to enhance clarity of the video frame.

In detail, in the present embodiment, the adjusting module 11 computes a ratio that the macro blocks within one or a plurality of regions (which is referred to as the target region) of the video frame are identified as the first type macro blocks and the second type macro blocks, and transforms the ratio into the cutoff frequency parameter. For example, the adjusting module 11 can obtain the cutoff frequency parameter corresponding to the ratio by looking up at least one look-up table. Alternatively, the adjusting module 11 can obtain the cutoff frequency parameter corresponding to the ratio by using at least one corresponding function. The corresponding function is, for example, a clip function. For example, the adjusting module 11 can obtain the cutoff frequency parameter by using a following equation (4):

$$\text{Cutoff frequency parameter} = \text{clip}(0.65, 0.8 \times \text{ratio}, 1.0) \quad (4)$$

In broader terms, the concept of the equation (4) is to normalize the cutoff frequency parameter to a predetermined range, for example, the adjusting module 11 can control a variable range of the cutoff frequency parameter between 0.65 and 1.0 or a similar predetermined range by using the clip function in the equation (4). Particularly, the variable range or the predetermined range has to be between 0 and 1 or is smaller than or equal to a range between 0 and 1, and an actual range of the variable range or the predetermined range can be adjusted according to an actual requirement, which is not limited by the invention.

The ratio of the equation (4) can be another function value, and different ratios are provided according to different regions, and such function can be linear, non-linear or a look-up table.

Moreover, in order to reach a balance between the cutoff frequency parameter corresponding to a previous video frame and the cutoff frequency parameter corresponding to the current video frame, the adjusting module 11 can average the cutoff frequency parameter corresponding to the current video frame and the cutoff frequency parameter corresponding to the previous video frame, and provides the averaged cutoff frequency parameter to the resizing module 14. Alternatively, considering the cost or other factors, the adjusting module 11 can selectively adjust the cutoff frequency parameters corresponding to a part of or all of the regions in the video frame, which is not limited by the invention.

It should be noticed that although the invention can be used to decrease a misidentifying rate of the devour module of the conventional technique on the macro block state or the state of macro block, the invention is not limited to amelioration of the devour module of the conventional technique. For example, as shown in the step S230 of FIG. 2, the adjusting module 11 can independently determine the macro block state of each macro block in the video frame according to the basic threshold corresponding to each of the regions in the video frame.

Moreover, the adjusting module 11, the de-interlacing module 12, the predetermining module 13 and the resizing module 14 are, for example, hardware devices composed of logic circuit components, which can be used to respectively execute the aforementioned functions. These modules can also be firmware or software programs stored in a hard disk or a memory of the image processing apparatus 10, which can be loaded to a processor of the image processing apparatus 10 to respectively execute the aforementioned functions. The processor is, for example, a central processing unit (CPU), etc., though the invention is not limited thereto.

It should be noticed that considering implementation cost and design requirements, besides the adjusting module 11 and the de-interlacing module 12, the predetermining module 13 and the resizing module 14 can be selectively added to the image processing apparatus 10. For example, the image processing apparatus 10 can simultaneously include the adjusting module 11, the de-interlacing module 12, the predetermining module 13 and the resizing module 14 to implement the functions mentioned in the aforementioned embodiments. Alternatively, the image processing apparatus 10 may include only one of the predetermining module 13 and the resizing module 14 to add the corresponding function. Moreover, the image processing apparatus 10 may only include the adjusting module 11 and the de-interlacing module 12 to implement the aforementioned basic functions.

In summary, according to the method and the image processing apparatus for identifying state of macro block of de-interlacing computing of the invention, the video frame can be divided into a plurality of regions, and the basic threshold corresponding to each of the regions can be adaptively adjusted. Then, the macro block state of each macro block can be identified according to a position of the macro block on the video frame and the basic threshold corresponding to the position, so as to perform the de-interlacing computing on the macro block through a suitable de-interlacing manner. Moreover, when the video frame is required to be resized, the method for identifying state of macro block of de-interlacing computing of the invention can adaptively perform the resizing computing on one or a plurality of regions in the video frame by using the cutoff frequency parameter. In this way, an identifying accuracy of the image processing apparatus on the macro block state of each macro block in the video frame can be effectively improved, and image clarity of the resized video frame can be greatly enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for identifying state of macro block of de-interlacing computing, adapted to an image processing apparatus, the method comprising:

dividing a video frame into a plurality of regions, wherein each of the region comprises a plurality of macro blocks;

providing a basic threshold corresponding to each of the regions according to a position of each of the regions in the video frame;

identifying a first macro block to be one of a first type macro block and a second type macro block according to the basic threshold corresponding to one of the regions where the first macro block of the macro blocks locates, wherein the first type macro block is a dynamic macro block and the second type macro block is a static macro block;

performing a corresponding de-interlacing computing step on the first macro block according to a result that the first macro block is identified as the first type macro block or the second type macro block;

presetting a preset threshold, wherein the preset threshold is used to preliminarily determine the first macro block to be the first type macro block or the second type macro block;

obtaining a threshold adjusting parameter corresponding to the preset threshold; and adjusting the basic threshold corresponding to one of the regions where the first macro block locates by using the threshold adjusting parameter.

2. The method for identifying state of macro block of de-interlacing computing as claimed in claim 1, wherein the step of obtaining the threshold adjusting parameter corresponding to the preset threshold comprises one of the following steps:

using a look-up table; and using a corresponding function, wherein the threshold adjusting parameter is positively correlated to the preset threshold.

3. The method for identifying state of macro block of de-interlacing computing as claimed in claim 1, further comprising:

computing a first number of the macro blocks identified as the first type macro block in one of the regions where the first macro block locates;

computing a second number of the macro blocks identified as the second type macro block in one of the regions where the first macro block locates; and adjusting the basic threshold corresponding to one of the regions where the first macro block locates according to the first number and the second number.

4. The method for identifying state of macro block of de-interlacing computing as claimed in claim 3, wherein the step of adjusting the basic threshold corresponding to one of the regions where the first macro block locates according to the first number and the second number comprises:

computing a ratio between the first number and the second number;

obtaining a threshold adjusting parameter corresponding to the ratio; and adjusting the basic threshold corresponding to one of the regions where the first macro block locates by using the threshold adjusting parameter.

5. The method for identifying state of macro block of de-interlacing computing as claimed in claim 4, wherein the step of obtaining the threshold adjusting parameter corresponding to the ratio comprises one of the following steps:

using a look-up table; and using a corresponding function, wherein the threshold adjusting parameter is positively correlated to the ratio.

6. The method for identifying state of macro block of de-interlacing computing as claimed in claim 1, further comprising:

computing a ratio of the macro blocks identified as the first type macro block and the second type macro block in at least one region of the regions;

transforming the ratio into a cutoff frequency parameter; and performing a resizing computing on the at least one region according to the cutoff frequency parameter.

7. The method for identifying state of macro block of de-interlacing computing as claimed in claim 6, wherein the step of transforming the ratio into the cutoff frequency parameter comprises one of the following steps:

using a look-up table; and using a clip function.

8. The method for identifying state of macro block of de-interlacing computing as claimed in claim 6, wherein the step of transforming the ratio into the cutoff frequency parameter comprises one of the following steps:

averaging the cutoff frequency parameter and a cutoff frequency parameter of a previous video frame; and normalizing the cutoff frequency parameter to a predetermined range, wherein the predetermined range is smaller than or equal to a range between 0 and 1.

9. The method for identifying state of macro block of de-interlacing computing as claimed in claim 1, wherein the regions at least comprise a first region, a second region and a third region, the second region is closer to an edge of the video frame compared to that of the first region, and the third region is closer to a corner of the video frame compared to that of the first region and the second region, wherein the basic thresholds respectively corresponding to the first region, the second region and the third region have at least one of the following relationships:

compared to the basic threshold corresponding to the first region, the basic threshold corresponding to the third region makes the macro blocks in the third region to be more easier identified as the second type macro block compared to that of the macro blocks in the first region;

compared to the basic threshold corresponding to the first region, the basic threshold corresponding to the second region makes the macro blocks in the second region to be more easier identified as the first type macro block compared to that of the macro blocks in the first region; and compared to the basic threshold corresponding to the second region, the basic threshold corresponding to the third region makes the macro blocks in the third region to be more easier identified as the second type macro block compared to that of the macro blocks in the second region.

10. An image processing apparatus, comprising:

an adjusting module, dividing a video frame into a plurality of regions, wherein each of the regions comprises a plurality of macro blocks; and a de-interlacing module, connected to the adjusting module, wherein the adjusting module provides a basic threshold corresponding to each of the regions according to a position of each of the regions in the video frame, and identifies a first macro block to be one of a first type macro block and a second type macro block according to the basic threshold corresponding to one of the regions where the first macro block of the macro blocks locates, wherein the first type macro block is a dynamic macro block and the second type macro block is a static macro block, wherein the de-interlacing module performs a corresponding de-interlacing computing step on the first macro block according to a result that the first macro block is identified as the first type macro block or the second type macro block, wherein the image processing apparatus further comprising:

a predetermining module, connected to the adjusting module, presetting a preset threshold, and using the preset threshold to preliminarily determine the first macro block to be the first type macro block or the second type macro block, wherein the adjusting module further obtains a threshold adjusting parameter corresponding to the preset threshold, and adjusts the basic threshold corresponding to one of the regions where the first macro block locates by using the threshold adjusting parameter.

11. The image processing apparatus as claimed in claim 10, wherein the adjusting module obtains the threshold adjusting parameter corresponding to the preset threshold by using a look-up table or using a corresponding function, wherein the threshold adjusting parameter is positively correlated to the preset threshold.

12. The image processing apparatus as claimed in claim 10, wherein the adjusting module further computes a first number of the macro blocks identified as the first type macro block in one of the regions where the first macro block locates, computes a second number of the macro blocks identified as the second type macro block in one of the regions where the first macro block locates, and adjusts the basic threshold corresponding to one of the regions where the first macro block locates according to the first number and the second number.

13. The image processing apparatus as claimed in claim 12, wherein the adjusting module computes a ratio between the first number and the second number, obtains a threshold adjusting parameter corresponding to the ratio, and adjusts the basic threshold corresponding to one of the regions where the first macro block locates by using the threshold adjusting parameter.

14. The image processing apparatus as claimed in claim 13, wherein the adjusting module obtains the threshold adjusting parameter corresponding to the ratio by using a look-up table or using a corresponding function, wherein the threshold adjusting parameter is positively correlated to the ratio.

15. The image processing apparatus as claimed in claim 10, further comprising:
a resizing module, connected to the adjusting module and the de-interlacing module,
wherein the adjusting module computes a ratio of the macro blocks identified as the first type macro block and the second type macro block in at least one region of the regions, and transforms the ratio into a cutoff frequency parameter,
wherein the resizing module performs a resizing computing on the at least one region according to the cutoff frequency parameter.

16. The image processing apparatus as claimed in claim 15, wherein the adjusting module transforms the ratio into the cutoff frequency parameter by using a look-up table or using a clip function.

17. The image processing apparatus as claimed in claim 15, wherein the adjusting module averages the cutoff frequency parameter and a cutoff frequency parameter of a previous video frame, or normalizes the cutoff frequency parameter to a predetermined range, wherein the predetermined range is smaller than or equal to a range between 0 and 1.

18. The image processing apparatus as claimed in claim 10, wherein the regions at least comprise a first region, a second region and a third region, the second region is closer to an edge of the video frame compared to that of the first region, and the third region is closer to a corner of the video frame compared to that of the first region and the second region, wherein the basic thresholds respectively corresponding to the first region, the second region and the third region have at least one of the following relationships:
compared to the basic threshold corresponding to the first region, the basic threshold corresponding to the third region makes the macro blocks in the third region to be more easier identified as the second type macro block compared to that of the macro blocks in the first region;
compared to the basic threshold corresponding to the first region, the basic threshold corresponding to the second region makes the macro blocks in the second region to be more easier identified as the first type macro block compared to that of the macro blocks in the first region; and
compared to the basic threshold corresponding to the second region, the basic threshold corresponding to the third region makes the macro blocks in the third region to be more easier identified as the second type macro block compared to that of the macro blocks in the second region.

* * * * *